United States Patent
Dooley et al.

(10) Patent No.: US 6,992,584 B2
(45) Date of Patent: Jan. 31, 2006

(54) MOBILE DEVICE COMPRISING A GPS RECEIVER

(75) Inventors: Saul R. Dooley, Reigate (GB); Andrew T. Yule, Felbridge (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 511 days.

(21) Appl. No.: 10/055,342

(22) Filed: Jan. 22, 2002

(65) Prior Publication Data

US 2002/0098816 A1 Jul. 25, 2002

(30) Foreign Application Priority Data

Jan. 23, 2001 (GB) ............................................. 0101692

(51) Int. Cl.
*G08B 1/08* (2006.01)
*H04Q 7/00* (2006.01)
*H04Q 7/20* (2006.01)
*H04B 7/14* (2006.01)
*G01C 21/28* (2006.01)

(52) U.S. Cl. ............. 340/540; 340/539.13; 340/539.21; 340/539.23; 340/825.36; 340/825.49; 455/25; 455/134; 455/423; 455/424; 455/425; 701/211; 701/213; 701/214

(58) Field of Classification Search ............ 340/539.13, 340/539.21, 539.23, 825.36, 825.49, 995.1, 340/998; 455/25, 134, 423–425; 701/211–214, 701/216; 342/357.08, 352–359

See application file for complete search history.

(56) References Cited

U.S. PATENT DOCUMENTS

| | | | | |
|---|---|---|---|---|
| 5,373,548 A | * | 12/1994 | McCarthy | 455/462 |
| 5,663,732 A | | 9/1997 | Stangeland et al. | 342/357 |
| 5,731,757 A | * | 3/1998 | Layson, Jr. | 340/573.1 |
| 5,905,460 A | * | 5/1999 | Odagiri et al. | 342/357.06 |
| 6,151,551 A | | 11/2000 | Geier et al. | 701/207 |
| 6,169,957 B1 | | 1/2001 | Arethens | 701/213 |
| 6,330,438 B1 | * | 12/2001 | McClelland et al. | 455/421 |

* cited by examiner

Primary Examiner—Jeffery Hofsass
Assistant Examiner—Lam Pham
(74) Attorney, Agent, or Firm—Aaron Waxler

(57) ABSTRACT

A mobile device (MS) is disclosed comprising a GPS receiver (14) and an audible alarm (13, 15) configured to sound, during operation of the GPS receiver, in response to either adverse performance of the GPS receiver or to an event which is adverse or likely to be adverse to the performance of the GPS receiver. The alarm may sound in response to the inability of the GPS receiver to either acquire or track a GPS signal, or obtain or maintain a position fix. Also, the alarm may sound in response to movement of the GPS receiver, including acceleration and higher order movement of the GPS receiver, in so far as that movement is adverse to the performance of the GPS receiver.

16 Claims, 1 Drawing Sheet

US 6,992,584 B2

MOBILE DEVICE COMPRISING A GPS RECEIVER

FIELD OF INVENTION

This invention relates to a mobile device, including a mobile communications device such as a mobile telephone, comprising a GPS receiver and an alarm.

BACKGROUND OF INVENTION

It is well known to provide a GPS receiver in which replica GPS satellite pseudorandom noise (PRN) code signals are continuously generated and correlated with received GPS signals in order to acquire them. Typically, as the replica codes are likely to have a different code phase to those of the received GPS signals and also a different frequency due to Doppler shift between the receiver and orbiting satellites, a two dimensional code frequency/phase sweep is employed whereby such a sweep will eventually result in the incoming PRN code having the same frequency and code phase as that of the locally generated replica. If detected, the code is acquired and tracked, and the pseudo-range information may be retrieved from which the position of the receiver may be calculated using conventional navigation algorithms.

It is further known to provide a mobile cellular telephone incorporating such a GPS receiver for the purpose of enabling operators of cellular telephone networks to determine the location from which a call is made and, in particular, for an emergency call to the emergency services. Of course for an emergency call, it is desirable for the call location to be available as soon as possible, however, from a "cold start" where the GPS receiver does not have access to up to date ephemeris data or even worse from a "factory cold start" where the GPS receiver does not have an up to date almanac, the time to first fix (TTFF) can be anywhere between 30 seconds and 5 minutes.

In order to reduce the TTFF, a GPS receiver may be provided with base station assistance in order to acquire GPS signals more quickly. Such assistance may include the provision by the base station to the receiver of a precision carrier frequency reference signal for calibrating the local oscillator used in the GPS receiver; the data message for up to date satellite almanac and ephemeris data from which Doppler shift for satellites in view can be determined; and the current PRN code phase. With such assistance, it is possible to sweep only a narrowed range of frequencies and code phases in which the target PRN code is known to occupy, thereby reducing the number of code instances that need to be checked and thus reducing the time for code acquisition. Base station assistance is further described in U.S. Pat. Nos. 5,841,396 and 5,874,914 which are incorporated herein by reference.

A substantial reduction in the number of code instances that need to be checked enables an increase in the dwell time for each check without significantly affecting the overall time to acquisition. The benefit of this is that an increase in the dwell time increases the probability of acquiring weak GPS signals. For example, for a single code instance or dwell, correlation may occur over a period of 10 ms, equivalent to approximately 10 PRN code repetitions (C/A mode), or over a longer period such as 100 ms to 1 s worth of individual 10 ms correlation periods, incoherently summed as disclosed in U.S. Pat. No. 5,874,914. The upshot of the above is that it is becoming more feasible to consistently acquire and track GPS signals in order to obtain a position fix with a mobile GPS receiver located indoors where signal reception is often very weak. This is very important as many telephone calls to the emergency services made on mobile telephones are made indoors.

U.S. Pat. No. 5,905,460 to Odagiri et al. discloses a wrist watch comprising a GPS receiver and an alarm means which may take the form of a buzzer and is sounded in response to the watch being in a position where it can receive GPS signals (lines 31 to 33 of column 3) and when the GPS positioning calculations have been completed (lines 7 to 12 of column 3). It further disclosed in U.S. Pat. No. 5,905,460 that the alarm is sounded after the following chain of events: the "wave" receiving condition is determined to be not good, then the wearer of the watch is determined to be walking, then the wave receiving operation is stopped and finally either a predetermined time or distance walked elapses (FIGS. 11 and 12 with reference to line 117 of column 7 to line 17 of column 8). The purpose of such an alarm appears to be to reduce power consumption of the wrist watch (line 64 of column 1 to line 11 of column 2).

OBJECT OF INVENTION

It is an object of the present invention to aid the acquisition and tracking of weak GPS signals such as those received indoors.

SUMMARY OF INVENTION

According to the present invention, there is provided a mobile device comprising a GPS receiver and an audible alarm configured to sound, during operation of the GPS receiver, in response to either adverse performance of the GPS receiver or to an event which is adverse or likely to be adverse to the performance of the GPS receiver. For example, the alarm may sound in response to the inability of the GPS receiver to either acquire or track a GPS signal, or obtain or maintain a position fix.

The alarm may also be configured to sound in response to movement of the GPS receiver, including acceleration and higher order movement, in so far as that movement is adverse to the performance of the GPS receiver. For example, in order to measure the acceleration of the GPS receiver, it may comprise an accelerometer whereby the alarm is configured to sound in response to an output from the accelerometer.

In either case, it is the purpose of the alarm to draw the users attention to the fact that the GPS receiver is operating and that it is either suffering adverse performance or is subjected to an event, such as waving or shaking, which makes adverse performance more likely. It is expected that a user upon hearing the alarm would be reminded to hold the GPS receiver more still and/or in a more prominent position in order to increase the chances of weak GPS signals being acquired and tracked, and a position determination being made accordingly.

For the avoidance of doubt, the above reference to the "operation of the GPS receiver" is intended to include attempted acquisition of the GPS signals as well as signal tracking after acquisition, and if a digital GPS receiver is employed, sampling of the GPS signals.

Also provided in accordance with the present invention is a mobile device comprising a digital GPS receiver and an alarm configured to active at a predetermined time prior to sampling received GPS signals and yet further provided in accordance with the present invention is a mobile communications device comprising a communications transmitter and receiver arranged for two-way communication with a base station, a GPS receiver and an alarm, including a visual or audible alarm, configured to activate in response to the device receiving a request transmitted from the base station for the device to return GPS pseudorange measurements or a position fix obtained using the GPS receiver.

BRIEF DESCRIPTION OF DRAWINGS

The present invention will now be described, by way of example only, of an embodiment of a mobile cellular telephone comprising a GPS receiver for use in a cellular telephone network with reference to the accompanying drawing in which.

DESCRIPTION OF PREFERRED EMBODIMENT

Figure 1:
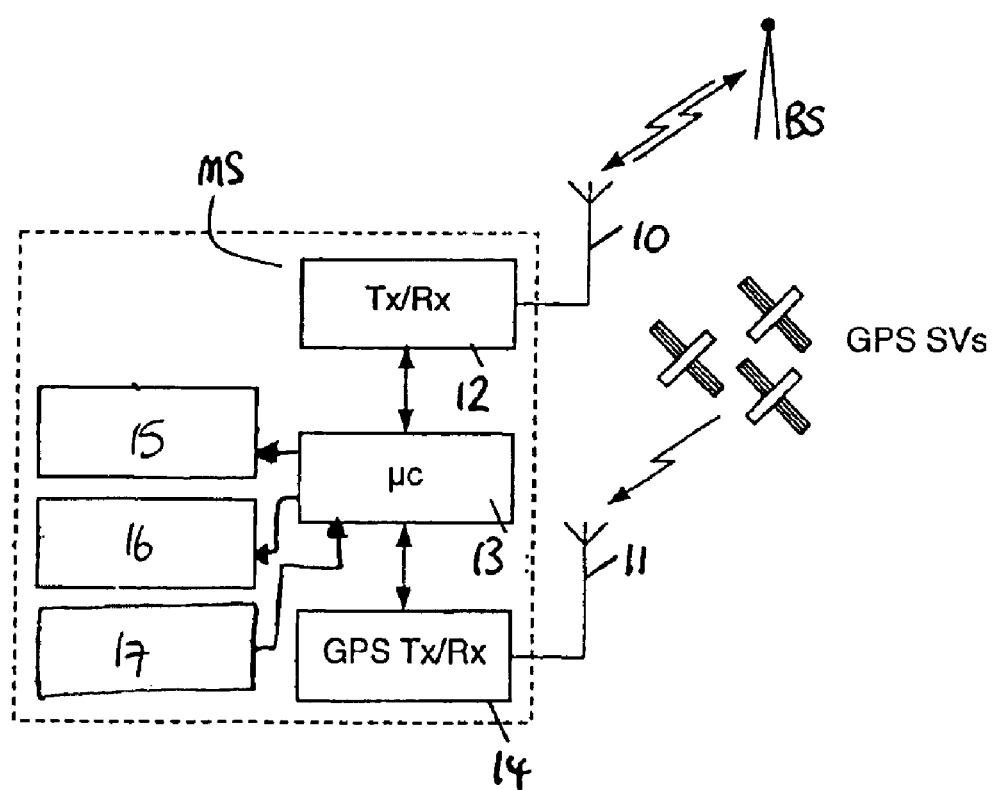
FIG. 1 shows schematically a mobile cellular telephone MS1 in accordance with the present invention.

FIG. 1 shows a mobile cellular telephone MS in accordance with the present invention, registered with a cellular telephone network base station BS and thereby facilitating voice and data communication between the telephone and a corresponding cellular telephone network (not shown) via that base station. Data communication is intended to include sending text messages (for example using the short message service (SMS) protocol) and accessing the internet (for example using WAP or i-mode protocols). The mobile telephone comprises a communications transmitter (Tx) and receiver (Rx) 12 connected to a communications antenna 10 and controlled by a microprocessor ($\mu c$) 13 for communication with the base station BS with which it is registered, a speaker 15 and a display 16. As the design and manufacture of such telephones for two-way communication within a cellular telephone network are well known, those parts which do not directly relate to the present invention will not be elaborated upon here further.

In addition to the conventional components of a mobile telephone, telephone MS, further comprises a GPS receiver (GPS Rx) 14 connected to a GPS antenna 11 and controlled by the microprocessor 13. GPS signals may be sampled and stored (often referred to as taking a "snapshot"), and processed for the purpose of deriving pseudorange information from which the location of the mobile telephone can be determined using conventional navigation algorithms. Such methods for GPS signal acquisition, tracking and position determination are well known, for example, GPS Principles and Applications (Editor, Kaplan) ISBN 0-89006-793-7 Artech House.

In additional to the conventional components of a cellular telephone network base station, base station BS further comprises a GPS antenna, receiver and microprocessor (not shown) which are in substantially continual operation whereby the base station is in constant possession of up to date GPS satellite information. This information includes which of the orbiting satellites are presently in view (such satellites are likely to be common to both telephone and associated base station for even macrocells, obscuration aside); the GPS data message containing an up to date almanac and ephemeris data, and the Doppler shift and current code phase of the GPS satellites signals as observed by the base station. As is known, in the event of the user of the mobile cellular telephone MS making an emergency call, the base station BS may provide this information to the telephone whereby it is then only required to sweep a narrowed range of frequencies and code phases in which the target PRN code is known to occupy, ensuring rapid code acquisition and TTFF. This information is then transmitted back to the base station from the telephone, and then on to the emergency services operator, termed the Public Safety Answer Point (PSAP) in the US.

To aid acquisition and tracking of weak GPS signals and in accordance with the present invention, the microprocessor 13 of the mobile cellular telephone MS is configured to sound an alarm using the speaker 15 during operation of the GPS receiver in response to either adverse performance of the GPS receiver or to an event which is adverse or likely to be adverse to the performance of the GPS receiver. This includes the inability of the GPS receiver to do any of the following:

acquire a GPS signal track a GPS signal obtain a position fix maintain a position fix The telephone MS further comprises an accelerometer 17 able to output a signal to the microprocessor indicative of the acceleration to which the telephone is subjected to, for example, by the user waving and shaking the telephone. For any movement exceeding a predetermined threshold above which it is assumed that such movement adversely affects the performance of the GPS receiver, the microprocessor initiates the alarm.

As previously mentioned, the purpose of the alarm to draw the users attention to the fact that the GPS receiver is operating and that it is either suffering of likely to suffer adverse performance attributable to perhaps waving or shaking the telephone. The audible alarm may be simple in nature, such as a buzzer, or more complicated and comprise pre-recorded verbal instructions to either reposition the mobile communications device, to refrain from moving the mobile communications device or to curb moving the mobile communications device. It may utilize a dedicated speaker or share the ear piece speaker or ringer present on conventional mobile telephones.

In alternative configurations of the above, the microprocessor may be configured to:

activate an alarm in response to the telephone receiving a request transmitted from the base station for the device to return GPS pseudorange measurements or a position fix obtained using the GPS receiver.

activate an alarm at a predetermined time prior to sampling received GPS signals.

In either case, the alarm may be audible as described above or alternatively visual, comprising either textual or pictorial instructions, and displayed on a display of the mobile communications device or as a separate light/indicator or a combination of any of these; and is again expected to remind a user to hold the GPS receiver more still and/or in a more prominent position in order to increase the chances of weak GPS signals.

With the former, the alarm may well be the first instance at which the user becomes aware that the GPS receiver is trying to operate, and hence of the importance to refrain from or at least to curb moving the telephone to aid signal acquisition and tracking. With the later, it is envisaged that the user upon notification by the alarm will at least temporarily hold the receiver still such that a snapshot taken a short while later will be devoid of degradation causes by disruptive movement.

The invention is described in relation to a GPS architecture employing a two dimensional code frequency/phase sweep, normally associated with early-minus-late correlation methods. However, fast convolution methods of signal acquisition and, in particular, those involving Fast Fourier Transforms (FFTs), may be used in order to acquired the PRN codes. Such convolution methods are described in a paper entitled "FFT processing of direct sequence spreading codes using modern DSP microprocessors" by Robert G Davenport, IEEE 1991 National Aerospace and Electronics Conference NAECON 1991, volume 1, pages 98 to 105, and also in U.S. Pat. No. 5,663,734. The method of the present invention is equally is applicable such convolution methods.

From a reading of the present disclosure, other modifications will be apparent to the skilled person skilled and may involve other features which are already known in the design, manufacture and use of GPS receivers and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly, whether or not it relates to the same invention as presently claimed in any claim and whether or not it mitigates any or all of the same problems as does the present invention. The applicants hereby give notice that new claims may be formulated to such features and/or combinations of such features during the prosecution of the present application or of any further derived therefrom.

What is claimed is:

1. A mobile device comprising a GPS receiver and an audible alarm configured to sound, during operation of the GPS receiver, in response to either adverse performance of the GPS receiver or to an event which is adverse or likely to be adverse to the performance of the GPS receiver, wherein the alarm is configured to sound in response to movement of the GPS receiver in so far as that movement is adverse to the performance of the GPS receiver.

2. A device according to claim 1 wherein the alarm is configured to sound in response to the inability of the GPS receiver to acquire or track a GPS signal.

3. A device according to claim 1 wherein the alarm is configured to sound in response to the inability of the GPS receiver to obtain or maintain a position fix.

4. A device according to claim 1 wherein the alarm is configured to sound in response to acceleration of the GPS receiver.

5. A device according to claim 4 wherein the GPS receiver further comprises an accelerometer to measure the acceleration of the GPS receiver whereby the alarm is configured to sound in response to an output from the accelerometer.

6. A device according to claim 1 wherein the audible alarm comprising pre-recorded verbal instructions to either reposition the mobile communications device, to refrain from moving the mobile communications device or to curb moving the mobile communications device.

7. A mobile device comprising a digital GPS receiver and an alarm configured to activate at a predetermined time prior to sampling received GPS signals.

8. A device according to claim 7 wherein the alarm is an audible alarm.

9. A device according to claim 8 wherein the audible alarm comprising pre-recorded verbal instructions to either reposition the mobile communications device, to refrain from moving the mobile communications device or to curb moving the mobile communications device.

10. A device according to claim 7 further comprising a display wherein the alarm is a visual alarm displayed on the display.

11. A device according to claim 10 wherein the visual alarm comprises instructions to either reposition the mobile communications device, to refrain from moving the mobile communications device or to curb moving the mobile communications device.

12. A mobile communications device comprising a communications transmitter and receiver arranged for two-way communication with a base station, a GPS receiver and an alarm configured to activate in response to the device receiving a request transmitted from the base station for the device to return GPS pseudorange measurements or a position fix obtained using the GPS receiver.

13. A device according to claim 12 wherein the alarm is an audible alarm.

14. A device according to claim 13 wherein the audible alarm comprising pre-recorded verbal instructions to either reposition the mobile communications device, to refrain from moving the mobile communications device or to curb moving the mobile communications device.

15. A device according to claim 12 further comprising a display wherein the alarm is a visual alarm displayed on the display.

16. A device according to claim 15 wherein the visual alarm comprises instructions to either reposition the mobile communications device, to refrain from moving the mobile communications device or to curb moving the mobile communications device.

* * * * *